United States Patent
Jones-McFadden et al.

(10) Patent No.: US 10,476,974 B2
(45) Date of Patent: Nov. 12, 2019

(54) SYSTEM FOR AUTOMATICALLY ESTABLISHING OPERATIVE COMMUNICATION CHANNEL WITH THIRD PARTY COMPUTING SYSTEMS FOR SUBSCRIPTION REGULATION

(71) Applicant: BANK OF AMERICA CORPORATION, Charlotte, NC (US)

(72) Inventors: Alicia C. Jones-McFadden, Fort Mill, SC (US); Suma Nagappa Kumaraswamy, Santa Clara, CA (US); Matthew Hsieh, Charlotte, NC (US); Scott R. Enscoe, Charlotte, NC (US); Elizabeth Ann Miller, Brooklyn, NY (US); Alicia Anli Salvino, Rockville, MD (US); Daniel Shilov, Nashua, NH (US); Michael Anderson, Colleyville, TX (US); Raghav Anand, Chadds Ford, PA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 267 days.

(21) Appl. No.: 15/288,826

(22) Filed: Oct. 7, 2016

(65) Prior Publication Data
US 2018/0103086 A1 Apr. 12, 2018

(51) Int. Cl.
*H04L 29/08* (2006.01)

(52) U.S. Cl.
CPC .................... *H04L 67/22* (2013.01)

(58) Field of Classification Search
CPC ....... H04L 67/22; H04L 67/306; G06Q 20/08; G06Q 40/02; G06Q 30/04
See application file for complete search history.

(56) References Cited

U.S. PATENT DOCUMENTS

| 5,864,684 A | 1/1999 | Nielson |
| 5,918,217 A | 6/1999 | Maggioncalda et al. |

(Continued)

FOREIGN PATENT DOCUMENTS

| CA | 2626172 A1 | 11/2009 |
| CA | 2629653 A1 | 11/2009 |

(Continued)

OTHER PUBLICATIONS

Egele, Manuel, et al., "COMPA: Detecting Compromised Accounts on Social Networks", NDSS 2013, San Diego, CA, Feb. 24-27, 3013, 17 pages.

(Continued)

*Primary Examiner* — Gil H. Lee
*Assistant Examiner* — Javier O Guzman
(74) *Attorney, Agent, or Firm* — Michael A. Springs; Moore & Van Allen PLLC; Nicholas C. Russell

(57) ABSTRACT

Embodiments of the invention are directed to a system, method, or computer program product for operative communication channel linkage between a user and subscription services for effective and efficient communicate with the third parties associated with the subscriptions. The invention eliminates the storage and processing requirement of a user device and allows a user system to use a single communication channel for communication for a centralized subscription regulation interface for subscription management and communications. The system identifies subscriptions from resource management sources and correlates the subscriptions to the subscription regulation interface for monitoring and trigger analysis based on locational and transactional user extraction.

20 Claims, 9 Drawing Sheets

(56) References Cited

U.S. PATENT DOCUMENTS

| | | | |
|---|---|---|---|
| 6,012,044 A | 1/2000 | Maggioncalda et al. | |
| 6,278,993 B1 | 8/2001 | Kumar et al. | |
| 6,327,578 B1* | 12/2001 | Linehan | G06Q 20/02 |
| | | | 705/65 |
| 6,629,081 B1 | 9/2003 | Cornelius et al. | |
| 6,633,910 B1 | 10/2003 | Rajan et al. | |
| 6,782,374 B2 | 8/2004 | Nichols | |
| 6,829,334 B1 | 12/2004 | Zirngibl et al. | |
| 6,892,192 B1 | 5/2005 | Geddes et al. | |
| 7,085,834 B2 | 8/2006 | Delany et al. | |
| 7,092,992 B1 | 8/2006 | Yu | |
| 7,103,556 B2 | 9/2006 | Del Rey et al. | |
| 7,165,041 B1 | 1/2007 | Guheen et al. | |
| 7,296,734 B2 | 11/2007 | Pliha | |
| 7,363,339 B2 | 4/2008 | Delany et al. | |
| 7,364,071 B2 | 4/2008 | Esplin et al. | |
| 7,406,537 B2 | 7/2008 | Cullen | |
| 7,412,534 B2 | 8/2008 | Tsang et al. | |
| 7,444,304 B2 | 10/2008 | Mellinger et al. | |
| 7,486,780 B2 | 2/2009 | Zirngibl et al. | |
| 7,624,073 B1 | 11/2009 | Robinson et al. | |
| 7,672,879 B1 | 3/2010 | Kumar et al. | |
| 7,698,190 B2 | 4/2010 | Penkalski et al. | |
| 7,774,257 B2 | 8/2010 | Maggioncalda et al. | |
| 7,788,147 B2 | 8/2010 | Haggerty et al. | |
| 7,797,267 B2 | 9/2010 | Horvitz | |
| 7,813,989 B2 | 10/2010 | Jones et al. | |
| 7,860,774 B1 | 12/2010 | Peterson et al. | |
| 7,912,770 B2 | 3/2011 | Haggerty et al. | |
| 8,060,423 B1 | 11/2011 | Rukonic et al. | |
| 8,073,759 B1 | 12/2011 | Del Favero et al. | |
| 8,122,123 B2 | 2/2012 | Bhattacharya et al. | |
| 8,135,655 B2 | 3/2012 | Oaten et al. | |
| 8,260,699 B2 | 9/2012 | Smith et al. | |
| 8,306,894 B2 | 11/2012 | Newman et al. | |
| 8,346,568 B1 | 1/2013 | Del Favero et al. | |
| 8,396,791 B2 | 3/2013 | Cotton | |
| 8,407,137 B2 | 3/2013 | Thomas | |
| 8,429,038 B1 | 4/2013 | Harman et al. | |
| 8,458,051 B1* | 6/2013 | Saltzman | G06Q 10/06 |
| | | | 705/26.7 |
| 8,473,380 B2 | 6/2013 | Thomas et al. | |
| 8,494,936 B2 | 7/2013 | Brenner | |
| 8,594,283 B2 | 11/2013 | Hogan et al. | |
| 8,639,567 B2 | 1/2014 | Winters | |
| 8,639,638 B2 | 1/2014 | Shae et al. | |
| 8,682,793 B2 | 3/2014 | Carlson et al. | |
| 8,713,090 B2 | 4/2014 | Sadovsky et al. | |
| 8,719,132 B1 | 5/2014 | Diggdon et al. | |
| 8,732,073 B2 | 5/2014 | Thomas | |
| 8,768,736 B1 | 7/2014 | Chapman et al. | |
| 8,768,800 B2 | 7/2014 | Milosavljevic et al. | |
| 8,768,833 B2 | 7/2014 | Freishtat et al. | |
| 8,788,661 B2 | 7/2014 | Raleigh | |
| 8,825,759 B1 | 9/2014 | Jackson et al. | |
| 8,930,217 B2 | 1/2015 | Feinschreiber et al. | |
| 8,935,342 B2 | 1/2015 | Patel | |
| 9,098,387 B1 | 8/2015 | Curtis et al. | |
| 9,256,876 B2 | 2/2016 | Vasant Akole et al. | |
| 9,286,637 B1 | 3/2016 | Keld et al. | |
| 9,411,942 B2 | 8/2016 | Commons et al. | |
| 9,460,443 B1 | 10/2016 | Curtis et al. | |
| 2002/0174185 A1 | 11/2002 | Rawat et al. | |
| 2002/0180786 A1 | 12/2002 | Tanner | |
| 2003/0120593 A1 | 6/2003 | Bansal et al. | |
| 2003/0139986 A1 | 7/2003 | Roberts, Jr. | |
| 2003/0206554 A1 | 11/2003 | Dillon | |
| 2004/0138959 A1 | 7/2004 | Hlavac et al. | |
| 2004/0153413 A1* | 8/2004 | Gross | G06Q 30/0281 |
| | | | 705/52 |
| 2004/0162773 A1 | 8/2004 | Del Rey et al. | |
| 2004/0175680 A1 | 9/2004 | Hlavac et al. | |
| 2004/0181591 A1* | 9/2004 | Yu | H04L 12/14 |
| | | | 709/217 |
| 2004/0189702 A1 | 9/2004 | Hlavac et al. | |
| 2005/0187862 A1 | 8/2005 | Dheer et al. | |
| 2006/0014535 A1 | 1/2006 | Walker et al. | |
| 2006/0224046 A1 | 10/2006 | Ramadas et al. | |
| 2006/0265201 A1 | 11/2006 | Martin | |
| 2007/0021200 A1 | 1/2007 | Fox et al. | |
| 2007/0112906 A1* | 5/2007 | Liu | H04L 67/02 |
| | | | 709/200 |
| 2007/0167689 A1 | 7/2007 | Ramadas et al. | |
| 2007/0174448 A1 | 7/2007 | Ahuja et al. | |
| 2007/0286099 A1* | 12/2007 | Stocklein | H04L 67/22 |
| | | | 370/259 |
| 2008/0014908 A1* | 1/2008 | Vasant | G08G 1/005 |
| | | | 455/414.1 |
| 2008/0034045 A1 | 2/2008 | Bardsley | |
| 2008/0114677 A1 | 5/2008 | Keohane et al. | |
| 2008/0133734 A1* | 6/2008 | Jacobs | H04L 29/06 |
| | | | 709/223 |
| 2009/0024984 A1 | 1/2009 | Maeda | |
| 2009/0106171 A1 | 4/2009 | Hlavac et al. | |
| 2009/0124349 A1 | 5/2009 | Dawson et al. | |
| 2009/0132395 A1 | 5/2009 | Lam et al. | |
| 2009/0276288 A1 | 11/2009 | Hlavac et al. | |
| 2010/0017619 A1 | 1/2010 | Errico | |
| 2010/0100470 A1 | 4/2010 | Buchanan et al. | |
| 2010/0121808 A1 | 5/2010 | Kuhn | |
| 2010/0257066 A1 | 10/2010 | Jones et al. | |
| 2010/0299252 A1 | 11/2010 | Thomas | |
| 2010/0306080 A1 | 12/2010 | Trandal et al. | |
| 2010/0325047 A1 | 12/2010 | Carlson et al. | |
| 2010/0332373 A1 | 12/2010 | Crabtree et al. | |
| 2011/0066505 A1 | 3/2011 | Hammad | |
| 2011/0106775 A1 | 5/2011 | Arbo et al. | |
| 2011/0131130 A1 | 6/2011 | Griffin et al. | |
| 2011/0213686 A1* | 9/2011 | Ferris | G06F 9/505 |
| | | | 705/34 |
| 2011/0275344 A1* | 11/2011 | Momtahan | H04L 12/14 |
| | | | 455/405 |
| 2012/0010933 A1 | 1/2012 | Satyavolu et al. | |
| 2012/0016858 A1 | 1/2012 | Rathod | |
| 2012/0122570 A1 | 5/2012 | Baronoff | |
| 2012/0155296 A1* | 6/2012 | Kashanian | H04L 12/1417 |
| | | | 370/252 |
| 2012/0173700 A1 | 7/2012 | De Andrade Cajahyba et al. | |
| 2012/0179564 A1 | 7/2012 | Soroca et al. | |
| 2012/0185368 A1 | 7/2012 | Schloter et al. | |
| 2012/0197794 A1 | 8/2012 | Grigg et al. | |
| 2012/0215640 A1 | 8/2012 | Ramer et al. | |
| 2012/0221446 A1 | 8/2012 | Grigg et al. | |
| 2012/0330971 A1 | 12/2012 | Thomas et al. | |
| 2013/0041819 A1 | 2/2013 | Khasho | |
| 2013/0054681 A1 | 2/2013 | Coyne | |
| 2013/0176908 A1* | 7/2013 | Baniel | H04L 12/1407 |
| | | | 370/259 |
| 2013/0227027 A1 | 8/2013 | May et al. | |
| 2013/0262312 A1 | 10/2013 | Carlson et al. | |
| 2013/0325598 A1 | 12/2013 | Shao et al. | |
| 2013/0325681 A1 | 12/2013 | Somashekar et al. | |
| 2014/0025491 A1 | 1/2014 | Nagarajan et al. | |
| 2014/0136381 A1 | 5/2014 | Joseph et al. | |
| 2014/0172560 A1 | 6/2014 | Satyavolu et al. | |
| 2014/0207584 A1* | 7/2014 | Wicha | G06Q 30/0276 |
| | | | 705/14.72 |
| 2014/0236846 A1* | 8/2014 | Melika | G06Q 50/184 |
| | | | 705/310 |
| 2014/0279800 A1 | 9/2014 | Anastasopoulos | |
| 2014/0335819 A1* | 11/2014 | Jahr | H04M 15/85 |
| | | | 455/406 |
| 2014/0365354 A1 | 12/2014 | Shvarts | |
| 2015/0026053 A1 | 1/2015 | Calman et al. | |
| 2015/0046307 A1 | 2/2015 | Calman et al. | |
| 2015/0079929 A1* | 3/2015 | McNamee | H04L 12/1407 |
| | | | 455/406 |
| 2015/0082458 A1 | 3/2015 | Cooper et al. | |
| 2015/0095132 A1 | 4/2015 | Van Heerden et al. | |
| 2015/0161671 A1* | 6/2015 | Watkeys | G06Q 30/0269 |
| | | | 705/14.66 |
| 2015/0351075 A1* | 12/2015 | Korver | H04W 52/0209 |
| | | | 455/458 |

(56) References Cited

U.S. PATENT DOCUMENTS

| | | | |
|---|---|---|---|
| 2015/0379582 A1* | 12/2015 | Jain | G06Q 30/0269 |
| | | | 705/14.66 |
| 2016/0034834 A1 | 2/2016 | Snell et al. | |
| 2016/0198322 A1* | 7/2016 | Pitis | H04W 4/18 |
| | | | 455/420 |
| 2016/0267597 A1 | 9/2016 | Johansen et al. | |
| 2016/0353237 A1* | 12/2016 | Shepherd | H04W 4/021 |
| 2016/0353386 A1* | 12/2016 | Sasidharan | H04W 52/0264 |
| 2016/0379107 A1 | 12/2016 | Li et al. | |
| 2017/0011398 A1 | 1/2017 | Narasimhan | |
| 2017/0013440 A1* | 1/2017 | Ostling | H04W 12/08 |
| 2017/0078861 A1* | 3/2017 | McNamee | H04L 12/1407 |
| 2018/0018158 A1* | 1/2018 | Kalke | G06F 8/65 |
| 2018/0063018 A1* | 3/2018 | Bosch | H04L 47/822 |
| 2018/0225754 A1 | 8/2018 | Del Vecchio et al. | |

FOREIGN PATENT DOCUMENTS

| | | |
|---|---|---|
| CA | 2634626 A1 | 1/2010 |
| CN | 103677488 A | 3/2014 |
| WO | 2004023451 A1 | 3/2004 |
| WO | 2006107799 A1 | 10/2006 |
| WO | 2007014201 A2 | 2/2007 |
| WO | 2008072255 A2 | 6/2008 |
| WO | 2008076997 A1 | 6/2008 |
| WO | 2014153128 A1 | 9/2014 |
| WO | 2014157891 A1 | 10/2014 |
| WO | 2014200692 A1 | 12/2014 |

OTHER PUBLICATIONS

Merriam Webster's Collegiate Dictionary, 10th Edition, Merriam-Webster, Incorporated, Springfield, MA, © 2000, p. 47.

* cited by examiner

SYSTEM FOR AUTOMATICALLY ESTABLISHING OPERATIVE COMMUNICATION CHANNEL WITH THIRD PARTY COMPUTING SYSTEMS FOR SUBSCRIPTION REGULATION

BACKGROUND

A user may be enrolled in multiple subscriptions for products and services using multiple resources associated therewith. Backend servers and networks control the operative communication channels between users and subscription services. These communication channels are non-integral and non-uniform for subscription deployment.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system, method, and computer program product for establishing operative communication channels with third party computing systems for subscription regulations.

In some embodiments, the invention creates a hub for single visualization and interaction with subscription of a user. As such, any resource accounts associated with the subscriptions may be easily viewed, use of the subscription, status of the subscription, and the like may all be visualized via the subscription regulation interface. The user may track records of payment of resources to the subscription, perform actions such as renewal, cancellation, update, modification, and the like via the subscription regulation interface. The subscription regulation interface may provide a user with visualization of his/her use of the subscription, modifications to the subscription, and/or competitor offers that may be more relative to the user's use of that particular resource. Furthermore, in some embodiments, the subscription regulation interface provides a temporary credit card account number for subscriptions, thus being able to regulate and cancel after a trial period or the like.

In some embodiments, the invention enables suggestions for improving the user's finances such as by increasing savings or the like. If the user subscribes to a membership, for example, then the application may track whether the user is actually using the membership during a specific period of time. For example, the application may determine, based on location data or transaction data, that the user never uses the gum membership or that the user is not sufficiently using a club membership. The application may aggregate in-application purchases or other recurring expenses. The application feature may enable automatic cancellation of the membership payments, such as by preventing further renewal payment from going through and/or being processed. The application may send a "don't renew" message or alert to the third party subscription service. The application enables addition of multiple payment accounts, such as multiple credit cards. One option for managing subscriptions is to only send eleven monthly payments automatically, but seek confirmation from the user before providing the twelve monthly payment in an annual subscription. Trial subscription periods may be marked and tracked so as to eliminate automatic renewal of unwanted trials.

Embodiments of the invention relate to systems, methods, and computer program products for a subscription regulation operative communication channel, the invention comprising: receiving authorization from a subscription regulation interface active on a user device via a secure communication portal, wherein the authorization allows access to user resource management source locations; extracting user resource distribution information from user resource management source locations; identifying reoccurring user resource distributions and third parties associated with the distributions; confirming, via the communication portal, a subscription associated with the reoccurring user resource distributions; extracting location data points associated with the user device and resource distribution data associated with user resource distribution, wherein the extraction is based on user authorization received from the subscription regulation interface; triggering presentation via the subscription regulation interface of underutilization of subscription based on extracted location data points and resource distribution data; presenting modification for user selection via the subscription regulation interface to the underutilized subscription; and processing the user selected modification.

In some embodiments, triggering presentation of underutilization of subscription based on extracted location data points and resource distribution data further comprises identifying locations the user traveled and purchases the user made via the extracted location data points and resource distribution data associated with the user to not be associated with the subscription, the third party, or the category of the subscription.

In some embodiments, the invention further comprises triggering a presentation via the subscription regulation interface of one or more subscriptions for renewal, wherein the renewal is presented by the subscription regulation interface upon identification of use of the subscription based at least in part on the extracted location data points and resource distribution data associated with the user to be associated with the subscription, the third party, or the category of the subscription.

In some embodiments, presenting modifications for user selection via the subscription regulation interface to the underutilized subscription further comprise communicating with the third party associated with the underutilized subscription for presenting cancellation options for the underutilized subscription to the user and presenting modifications to the underutilized subscription that reducing the resource requirements for the subscription user, wherein presenting modifications for user selection further comprises presenting competitor subscriptions to the user.

In some embodiments, confirming, via the communication portal, the subscription associated with the reoccurring user resource distributions further comprises identifying a physical location of the third parties associated with the subscription and a category of products and/or services provided via the subscription.

In some embodiments, processing the user selected modification further comprises providing the third party with a generic account number for initial resource distribution to the third party for the modification of the subscription.

In some embodiments, extracting location data points associated with the user device and resource distribution data associated with user resource distribution further comprises identifying locations that the user has traveled and resource distributions associated with product/service purchases the user made and identifying a category of the locations and purchases, wherein the category is compared to a category identified as associated with the subscription and determined to be of the same category of product or service.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
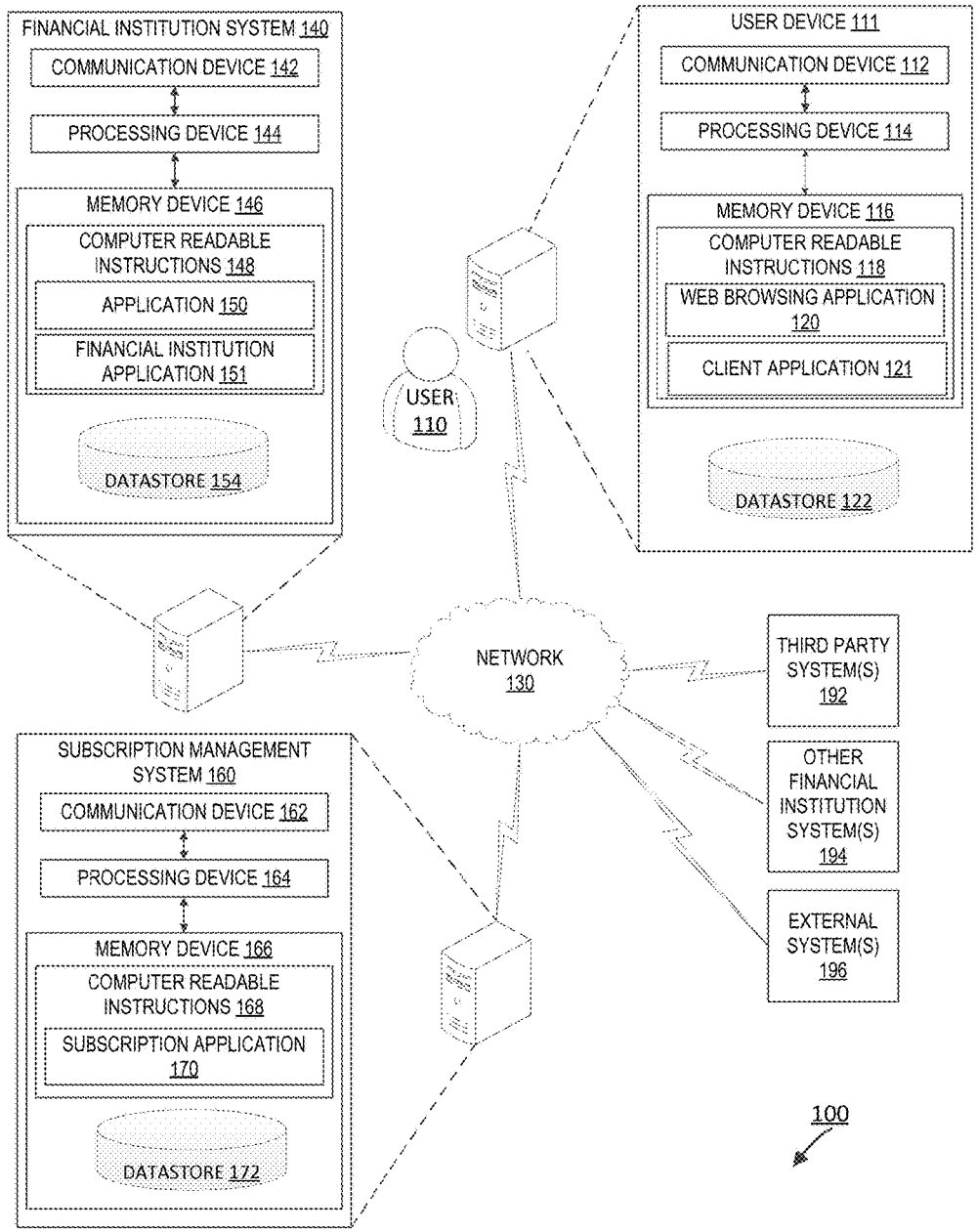
Figure 2A:
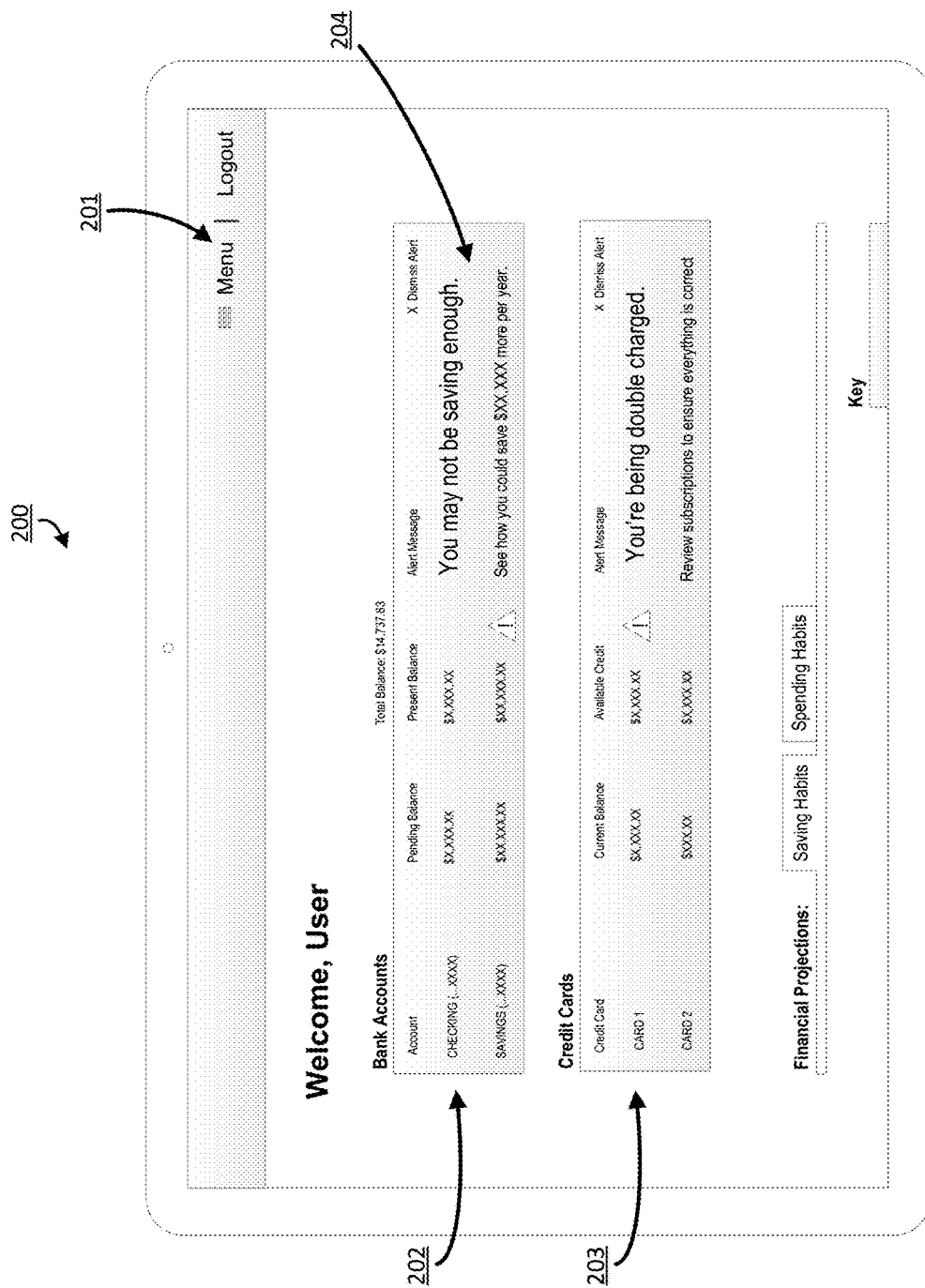
Figure 2B:
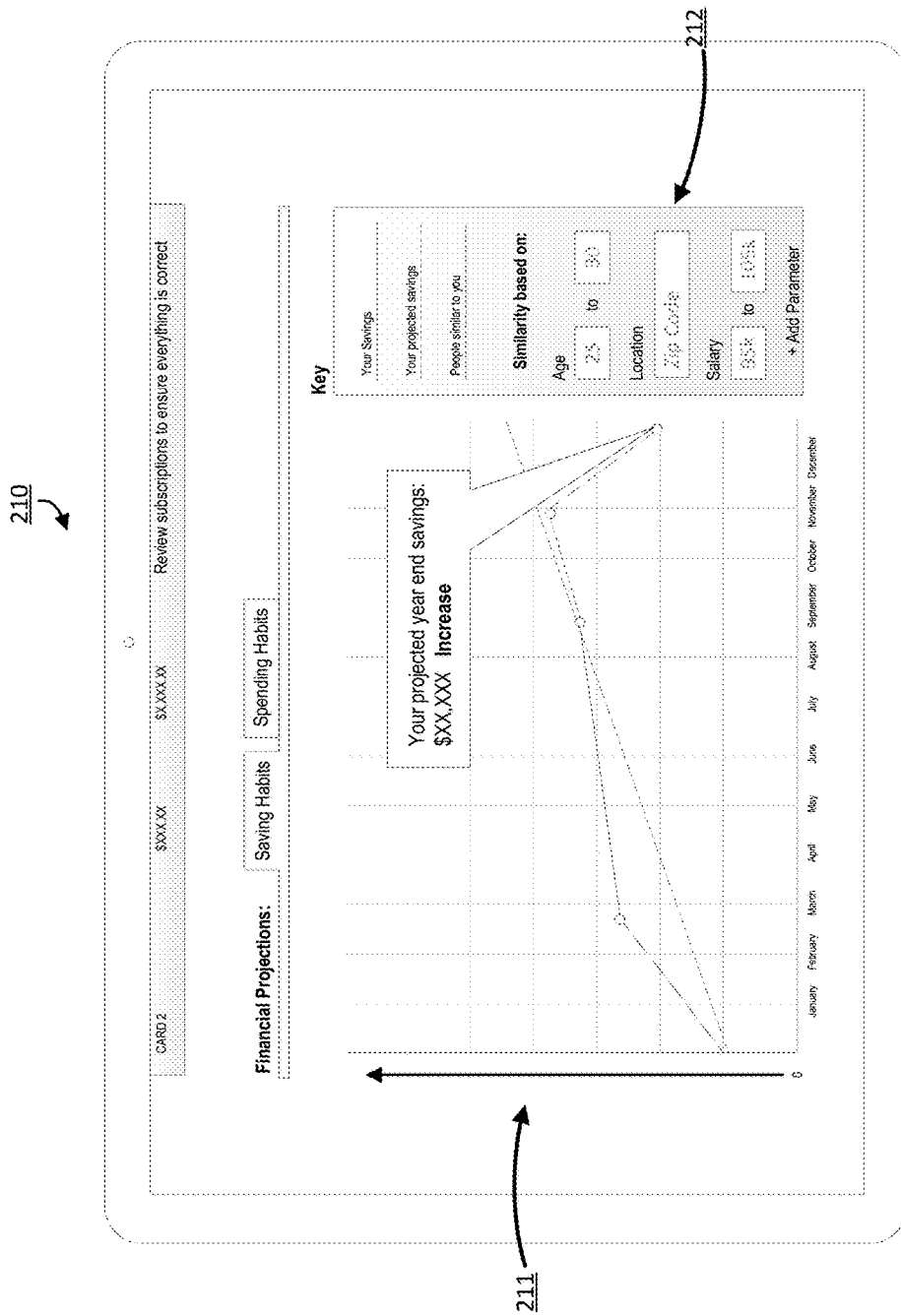
Figure 2C:
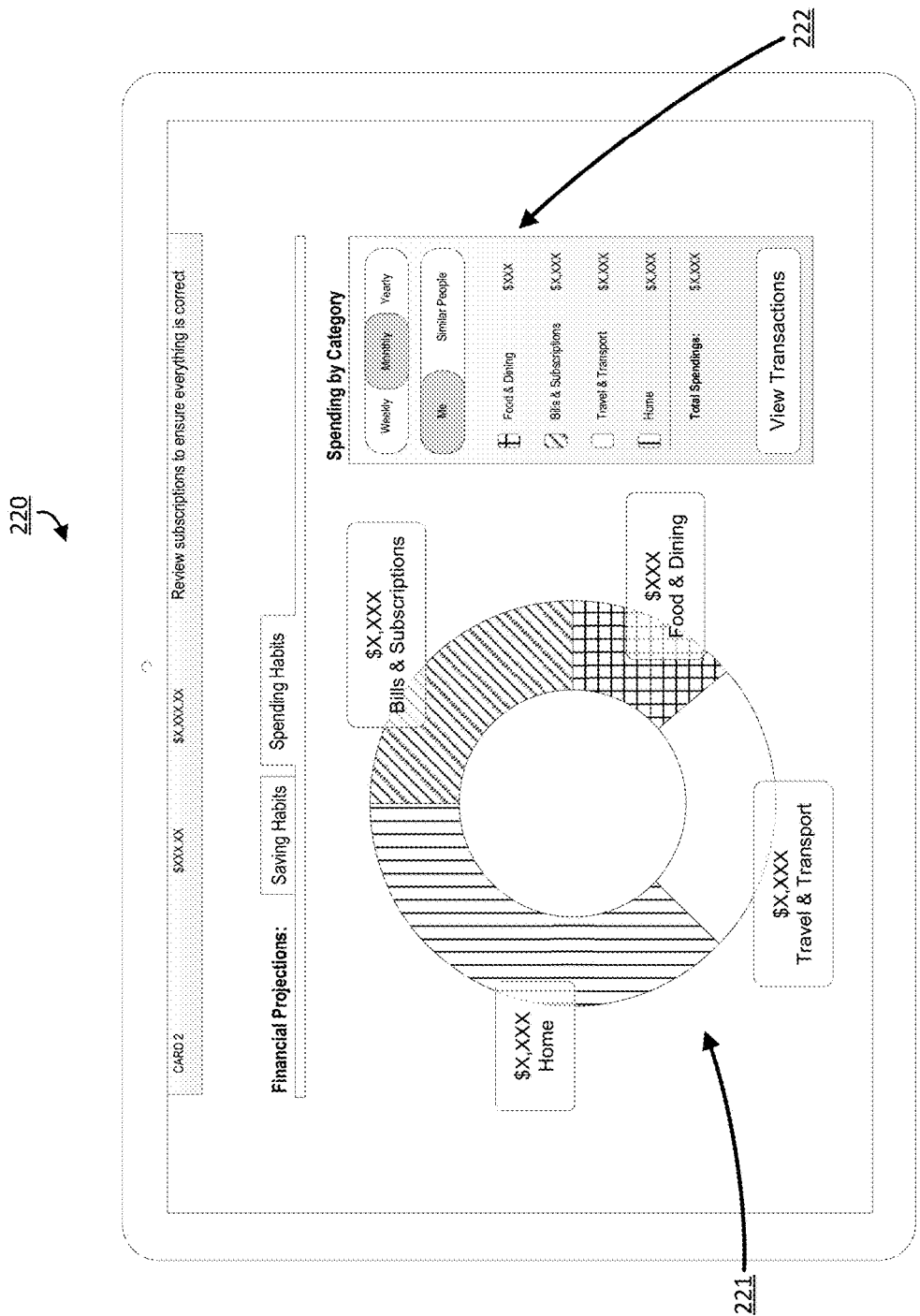
Figure 2D:
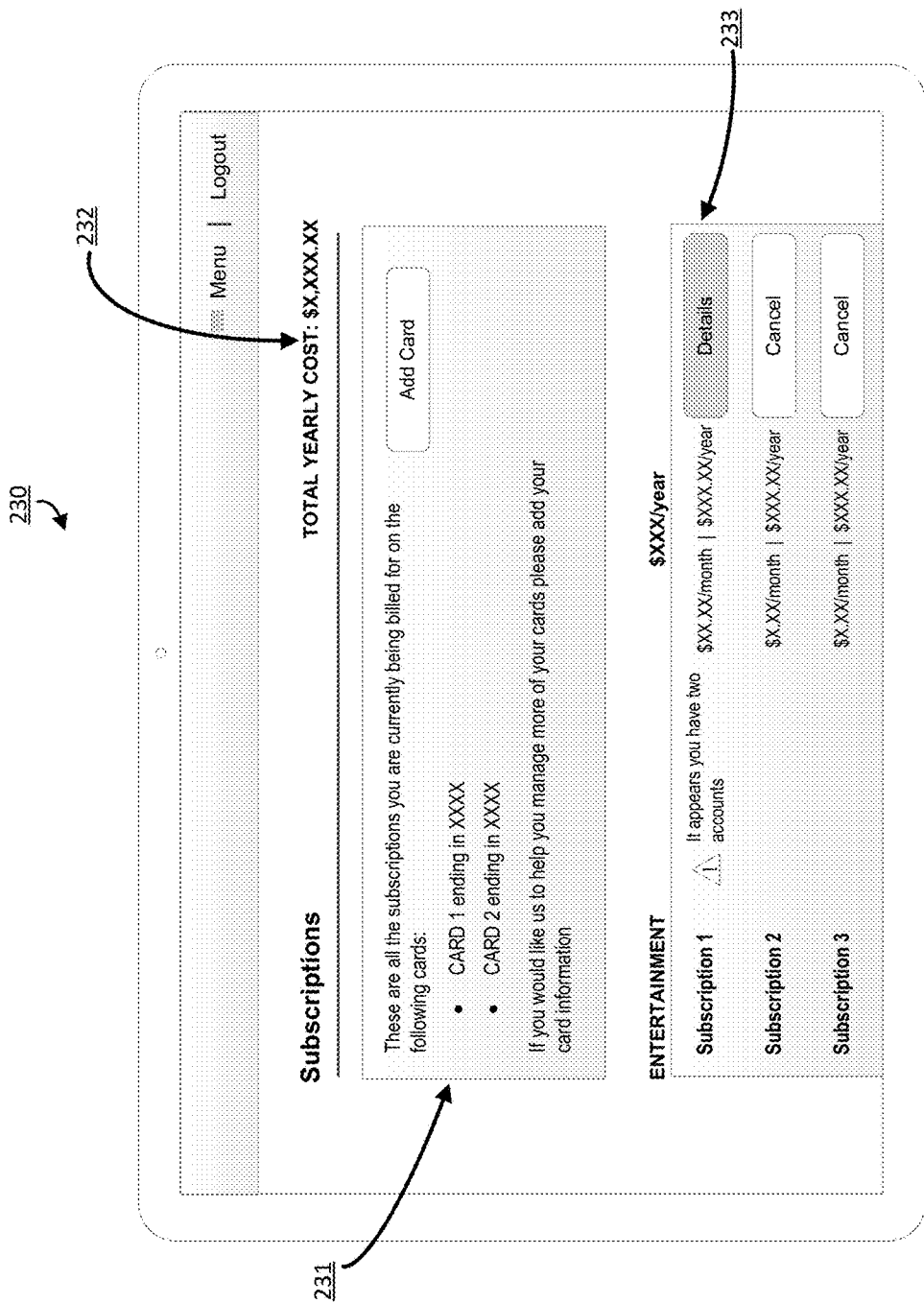
Figure 2E:
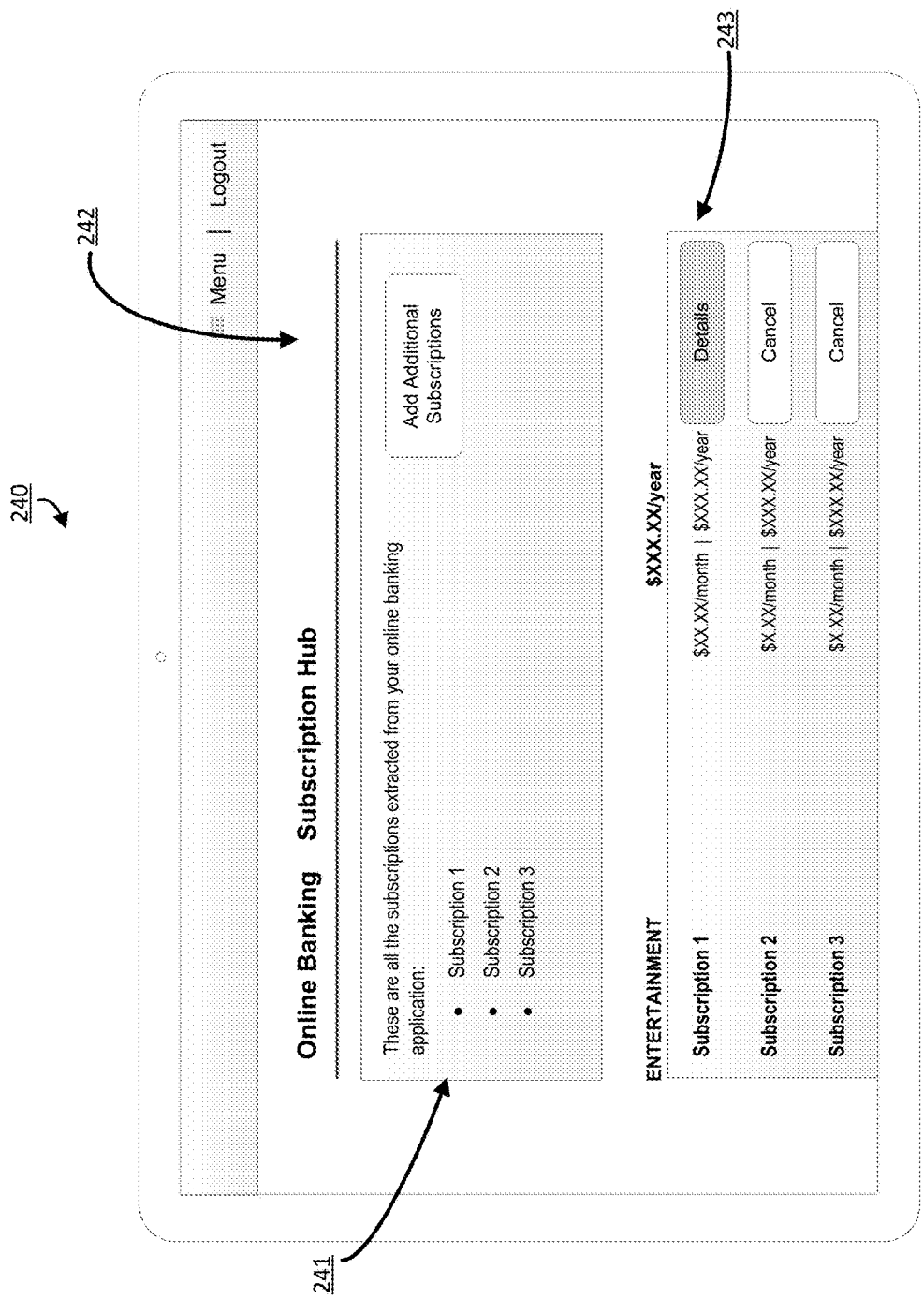
Figure 3:
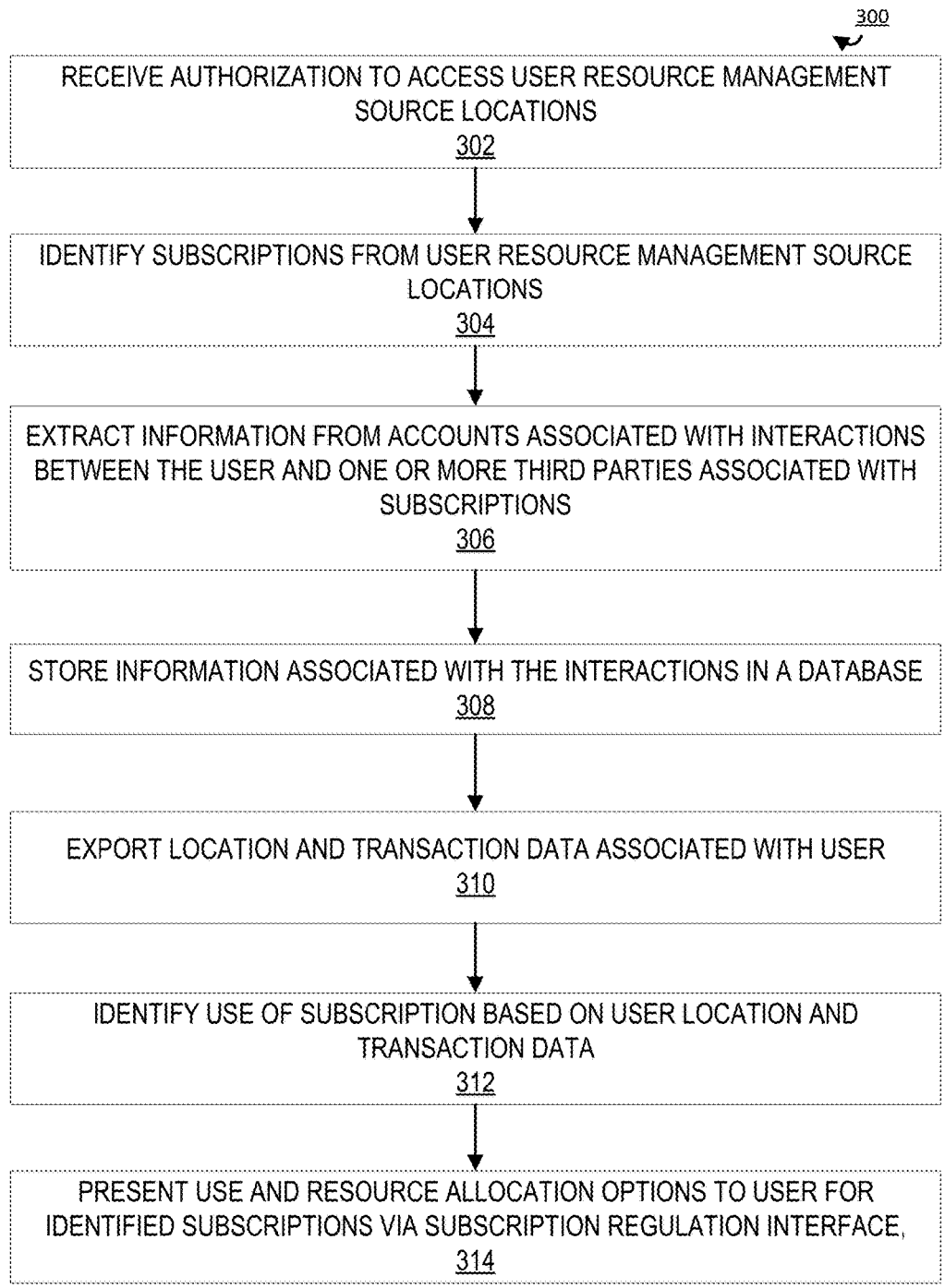
Figure 4:
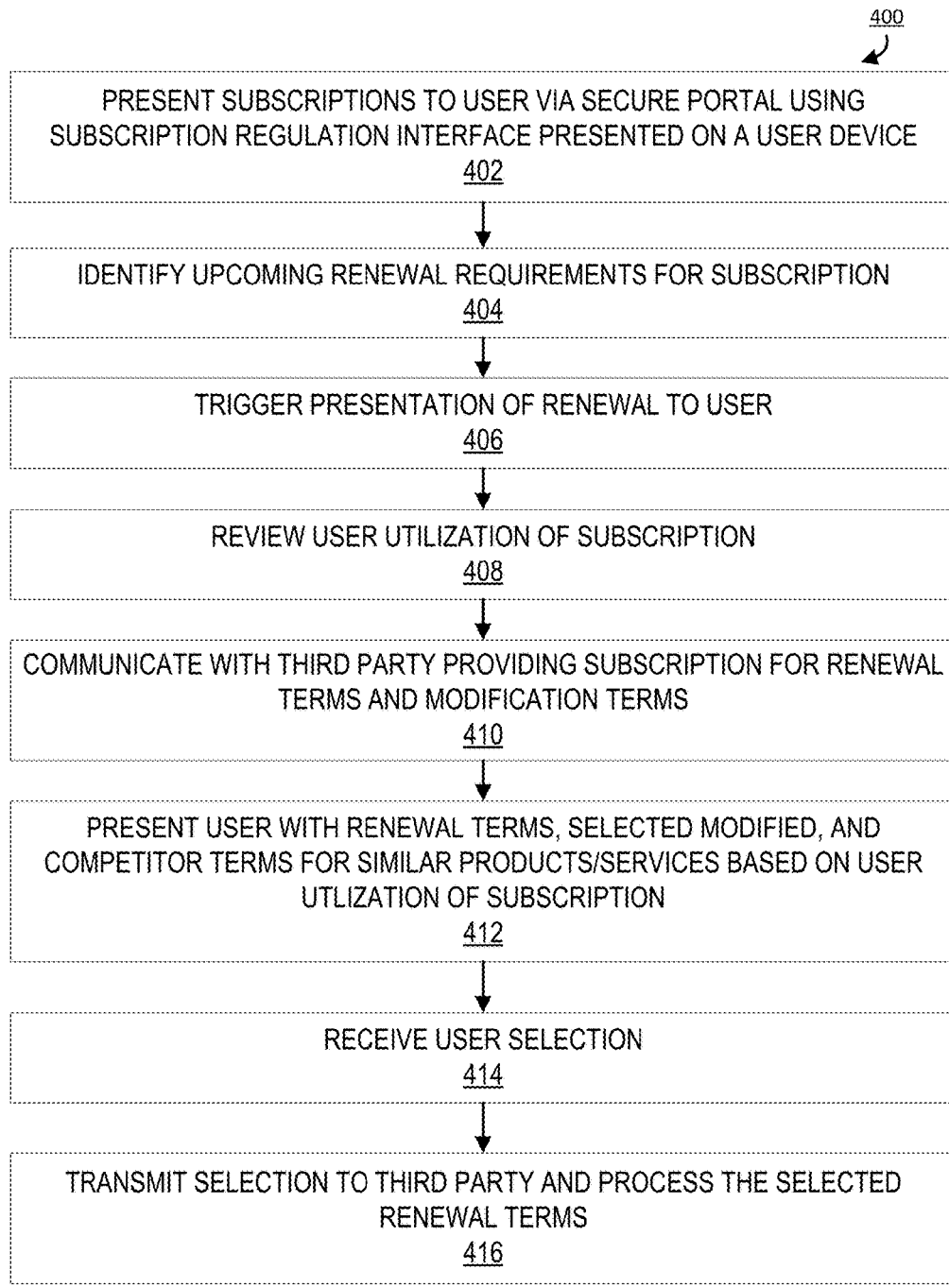
Figure 5:
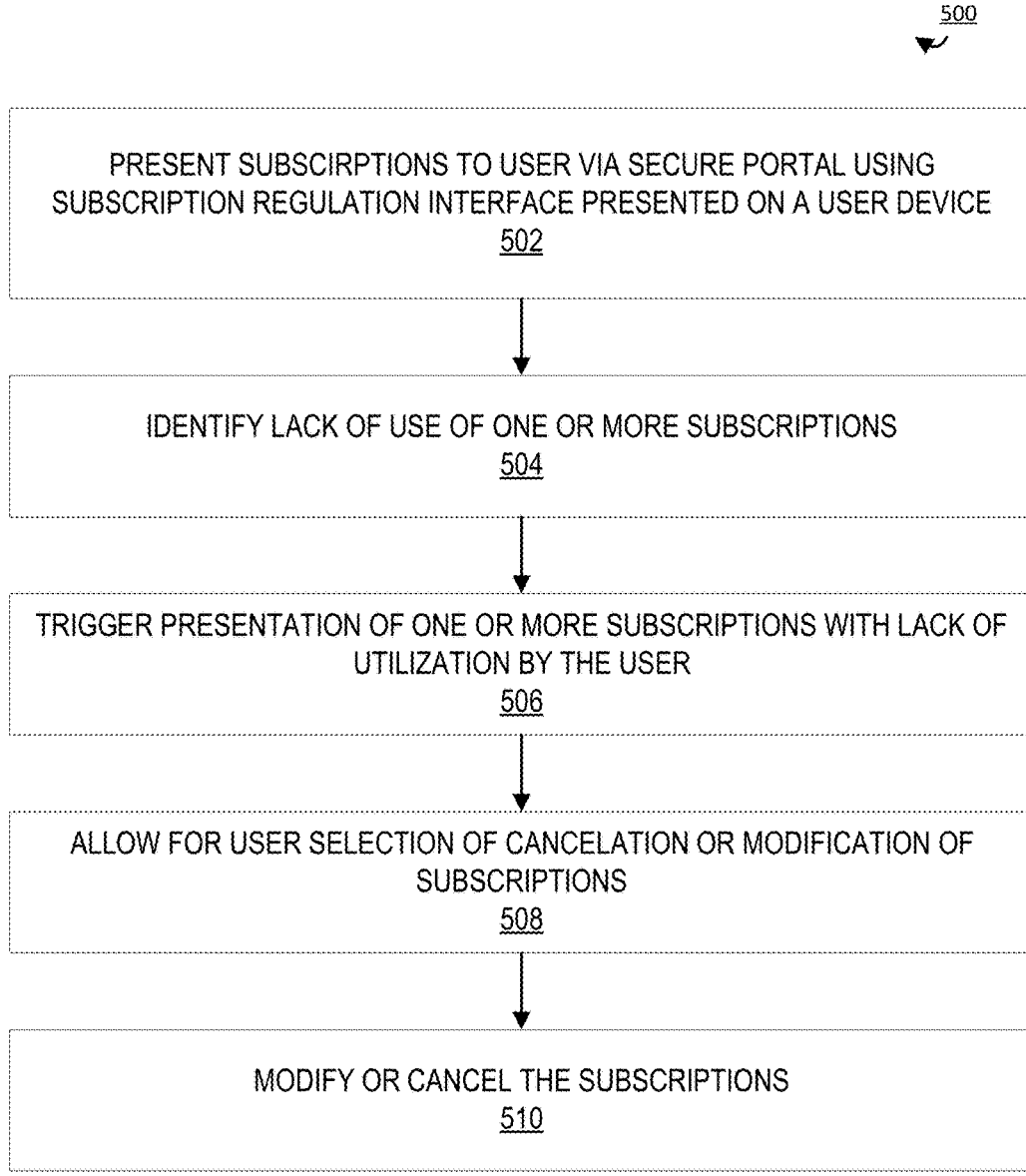

Having thus described embodiments of the invention in general terms, reference will now be made to the accompanying drawings, wherein:

FIG. 1 provides a system environment in which embodiments of the invention operate, in accordance with one embodiment of the present invention;

FIG. 2A illustrates a graphical representation of a portion of an application user interface, in accordance with some embodiments of the invention;

FIG. 2B illustrates a graphical representation of a portion of an application user interface for monitoring asset savings, in accordance with some embodiments of the invention;

FIG. 2C illustrates a graphical representation of a portion of an application user interface for monitoring asset spending, in accordance with some embodiments of the invention;

FIG. 2D illustrates a graphical representation of a portion of an application user interface for monitoring subscriptions, in accordance with some embodiments of the invention;

FIG. 2E illustrates a graphical representation of a portion of an application user interface as a subscription hub, in accordance with some embodiments of the invention;

FIG. 3 provides a high level process flow for subscription regulation, in accordance with one embodiment of the invention;

FIG. 4 provides a high level process flow for modifying and triggering action for subscription continuation, in accordance with one embodiment of the invention; and FIG. 5 provides a high level process flow for triggering the modification or canceling of subscriptions, in accordance with one embodiment of the invention.

DETAILED DESCRIPTION OF THE INVENTION

The present invention aggregates user resources from multiple different entities into a single, centralized database allowing for efficient storage of information and data that would normally need to be requested from outside systems when called upon by the processes of the system. Furthermore, data from third party interaction providers is extracted by the system and stored in the database for quick-access and reference. The system's centralized storage of information allows for efficient access to aggregated data which further allows for the processing power of the computing device to be made available for additional or other tasks.

Additionally, the present invention addresses a problem which arises out backend servers and networks that control the operative communication channels between users and subscription services which are non-integral and non-uniform for subscription deployment. Being able to effectively and efficiently communicate with the third parties associated with subscriptions requires memory on a user device and communication to separate party servers. The invention eliminates the storage requirement, specifically requiring only a portion of memory within the user device. Furthermore, the system automatically establishes an operative communication channel with the third parties, thus not requiring separate communication channels for communicating with the separate third parties, but instead generating a universal communication channel that allows the user system to use a single communication channel for communication with a centralized hub for subscription management and communications.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

An "account" is the relationship that a user has with an entity, such as a financial institution. Examples of accounts include a deposit account, such as a transactional account (e.g., a banking account), a savings account, an investment account, a money market account, a time deposit, a demand deposit, a pre-paid account, a credit account, a non-monetary user profile that includes information associated with the user, or the like. The account is associated with and/or maintained by the entity. The terms "resource" and "account" may be used interchangeably. "Assets" include accounts of the user and/or other property owned by the user. The assets may be associated with accounts or may be property that is not associated with a specific account. Examples of assets associated with accounts may be accounts that have cash or cash equivalents, or accounts that are funded with or contain property, such as safety despots box account that jewelry, a trust account that is funded with property, or the like. Examples of assets that may not be associated with accounts may be antiques in a user's home, jewelry in a user's home, or the like. "Authentication information" is any information that can be used to identify of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system.

An "entity" as used herein may be a financial institution. In some embodiments, the entity may allow a user to establish an account with the entity. For the purposes of this invention, a "financial institution" is any organization, entity, or the like in the business of moving, investing, or lending money, dealing in financial instruments, or providing financial services. This may include commercial banks, thrifts, federal and state savings banks, savings and loan associations, credit unions, investment companies, credit card companies, insurance companies and the like. A "financial event" or "life event" may be any immediate or future event that causes a change in a user's financial status. A financial event may be a charge, a transaction, and exchange, or the like that may cause the user to lose or gain money and/or assets. Examples of financial events or life events include a medical expense, buying a house, college tuition, rent, moving to a new city, receiving a raise or bonus in pay and the like. To "monitor" is to watch, observe, or check something for a special purpose over a period of time. The "monitoring" may occur periodically over the period of time, or the monitoring may occur continuously over the period of time. In some embodiments, a system may actively monitor a database, wherein the system reaches out to the database and watches, observes, or checks the database for changes, updates, and the like. In other embodiments, a system may passively monitor a database, wherein the database provides information to the system and the system then watches, observes, or checks the provided information.

A "transaction" refers to any communication between a user and the financial institution or other entity monitoring the user's activities. A transaction may also refer to any communication between a user and a third party. For example, a transaction may refer to a purchase of goods or services, a return of goods or services, a payment transaction, a credit transaction, or other interaction involving a user's account. In the context of a financial institution or third party, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, digital items and the like); making payments to creditors (e.g., paying monthly bills; paying federal, state, and/or local taxes; and the like); sending remittances; loading money onto stored value cards (SVCs) and/or prepaid cards; donating to charities; and/or the like. An "interaction" as used herein refers to any recurring or fixed term payment and/or agreement between a user and an entity for a product and/or service provided to the user by the entity. For example, an interaction may be a subscription, a membership, a utility service and the like. An interaction may refer to a free, on-going relationship between a user and an entity such as a trial offer, a rewards club, and the like. An interaction may also refer to a one-time payment. the term "interaction" may be used interchangeably with "transaction."

A "user" may be a financial institution customer (e.g., an account holder or a person who have an account (e.g., banking account, credit account, or the like)). In one aspect, a user may be any financial institution customer involved managing spending and accounts with the financial institution or any other affiliate entities associated with the financial institution. In some embodiments, the user may be an individual who may be interested in opening an account with the financial institution. In some embodiments, a "user" may be a financial institution employee (e.g., an underwriter, a project manager, an IT specialist, a manager, an administrator, an internal operations analyst, bank teller or the like) capable of operating the system described herein. For purposes of this invention, the term "user" and "customer" may be used interchangeably. A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein a "subscription" may be any reoccurring service or product being provided to a user from a third party. A payment may be made on a recurring bases such as daily/weekly/monthly/yearly to the third party from the user. The service or product may include a membership to a club, gym, or the like. The service may be an online club, membership, team, association, magazine, or the like. Furthermore, the subscription may be for a product such as classes, a magazine, books, produce, or other products provided on a reoccurring basis.

Referring now to FIG. 1, the figure illustrates a processing system environment 100, in accordance with some embodiments of the invention. The environment 100 includes a user device 111 associated or used with authorization of a user 110 (e.g., an account holder, a mobile application user, a bank customer, and the like), a subscription management system 160, and a financial institution system 140. In some embodiments, the subscription management system 160 corresponds to a third party financial institution. The environment 100 further includes one or more third party systems 192 (e.g., a partner, agent, or contractor associated with a financial institution), one or more other financial institution systems 194 (e.g., a credit bureau, third party banks, and so forth), and one or more external systems 196 comprising components similar to the other systems.

The systems and devices communicate with one another over the network 130 and perform one or more of the various steps and/or methods according to embodiments of the disclosure discussed herein. The network 130 may include a local area network (LAN), a wide area network (WAN), and/or a global area network (GAN). The network 130 may provide for wireline, wireless, or a combination of wireline and wireless communication between devices in the network. In one embodiment, the network 130 includes the Internet.

The user device 111, the subscription management system 160, and the financial institution system 140 each includes a computer system, server, multiple computer systems and/or servers or the like. The financial institution system 140, in the embodiments shown has a communication device 142 communicably coupled with a processing device 144, which is also communicably coupled with a memory device 146. The processing device 144 is configured to control the communication device 142 such that the financial institution system 140 communicates across the network 130 with one or more other systems. The processing device 144 is also configured to access the memory device 146 in order to read the computer readable instructions 148, which in some embodiments includes one or more applications such as application 150 and financial institution application 151. The memory device 146 also includes a datastore 154 or database for storing pieces of data that can be accessed by the processing device 144.

As used herein, a "processing device," generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 114, 144, or 164 may further include functionality to operate one or more software programs based on computer-executable program code thereof, which may be stored in a memory. As the phrase is used herein, a processing device 114, 144, or 164 may be "configured to" perform a certain function in a variety of ways, including, for example, by having one or more general-purpose circuits perform the function by executing particular computer-executable program code embodied in computer-readable medium, and/or by having one or more application-specific circuits perform the function.

Furthermore, as used herein, a "memory device" generally refers to a device or combination of devices that store one or more forms of computer-readable media and/or computer-executable program code/instructions. Computer-readable media is defined in greater detail below. For example, in one embodiment, the memory device 146 includes any computer memory that provides an actual or virtual space to temporarily or permanently store data and/or commands provided to the processing device 144 when it carries out its functions described herein.

The user device 111 includes a communication device 112 communicably coupled with a processing device 114, which is also communicably coupled with a memory device 116. The processing device 114 is configured to control the communication device 112 such that the user device 111 communicates across the network 130 with one or more other systems. The processing device 114 is also configured to access the memory device 116 in order to read the computer readable instructions 118, which in some embodiments includes application 120 and client application 121. In some embodiments, the client application 121 and the other applications provide a graphical user interface (GUI) on a display that allows the user 110 to communicate with the user device 111 and/or other devices or systems. The memory device 116 also includes a datastore 122 or database for storing pieces of data that can be accessed by the processing device 114. The user device 111 may be a mobile device of the user 110, a bank teller device, a third party device, an automated teller machine, a video teller machine, or another device capable of capturing a check image.

The subscription management system 160 includes a communication device 162 communicably coupled with a processing device 164, which is also communicably coupled with a memory device 166. The processing device 164 is configured to control the communication device 162 such that the subscription management system 160 communicates across the network 130 with one or more other systems. The processing device 164 is also configured to access the memory device 166 in order to read the computer readable instructions 168, which in some embodiments includes a subscription application 170 configured to monitor and manage interactions associated with the user 110. The memory device 166 also includes a datastore 172 or database for storing pieces of data that can be accessed by the processing device 164.

In some embodiments, the application 120, the client application 121, and the application 170 interact with the application 150 or 151 to receive or provide financial data, analyze financial record data, and implement business strategies, transactions, and processes. The applications 150 and 151 may be a suite of applications for performing these functions. In some embodiments, the application 120, the client application 121, and the application 170 interact with the applications 150 and 151 to utilize metadata to determine decisions for processing.

Described throughout much of the present application, the subscription management application 170, in some embodiments, transmits a client application 121 to the user computing device 111. In some embodiments, when the user 110 decides to enroll in the mobile or online banking program, the user 110 downloads or otherwise obtains the client application 121 from the financial institution system 140, the subscription management system 160, and/or a distinct application server, the client application 121 being configured to operate as a mobile application and/or an online banking application. In other embodiments, the user 110 may interact with the other systems via a web browsing application 120 in addition to, or instead of, the client application 121.

In some embodiments, the subscription management application 170 receives authorization from the user device 111 via the client application 121 to access and extract data from accounts associated with the user 110. In one embodiment of the invention, the client application 121 presents a GUI to the user 110 to receive authorization for access to the user accounts and/or authentication information associated with the user accounts. The user 110 may be prompted to provide account details such as account numbers, credit card numbers, login information such as usernames, passwords, and security codes, and the like associated with the user accounts being accessed by the application 170. In other embodiments, the user 110 is a customer of the financial institution, wherein the user accounts are maintained by the financial institution and automatically associated with the user 110 within the subscription management application 170. In some embodiments, the user accounts are maintained by a third party such as a third party financial institution, wherein the application 170 establishes an operative communication channel to the third party system 192 upon receiving authorization and/or authentication information from the user 110. In some embodiments, the application 170 stores information and/or data associated with the user accounts maintained by the third party in the database.

In some embodiments, based on receiving authorization from the user device 111, the subscription management application 170 extracts information from the user accounts. The information extracted by the application 170 from the user accounts comprises information associated with interactions associated with the user 110. In some embodiments, the interactions associated with the user 110 are third party interactions between the user 110 and one or more third parties. In some embodiments, the application 170 may identify keywords in the extracted information to identify interactions associated with the user 110. In other embodiments, the application 170 may prompt the user 110 via the client application to indicate transactions associated with third party interactions and/or provide the name of a third party interaction associated with the user 111. In some embodiments, the application 170 may identify that a payment is regularly made to the same third party provider and determine that the payments comprise an interaction between the user 110 and the third party provider.

In some embodiments, the subscription management application 170 stores the extracted information associated with the third party interactions between the user 110 and one or more third parties in a database. In some embodiments, the information is stored in a centralized database, wherein information associated with one or more transactions are stored in a single location, reducing the time needed to search for a particular transaction or series of transactions related to one or more interactions.

In some embodiments, the subscription management application 170 modifies the at least one third party interaction. In some embodiments, the subscription management application 170 may automatically cancel a third party interaction after the application 170 identifies the third party interaction as a duplicate interaction. In some embodiments of the invention, the application 170 cancels the third party interaction by interrupting one or more payments from the user accounts for the third party interaction. In this embodiment, the third party interaction may be canceled without requiring input from the user and/or requiring user account information associated with the third party account.

In some embodiments, the subscription management application 170 transmits an actionable notification to the user device 111 which presents the user 110 with the at least one third party interaction previously identified by the application 170. The notification is transmitted to the user device 111 via the client application which allows the user to interact with the actionable notification and input user instructions for modifying the at least one third party interaction identified as a duplicate third party interaction. In some embodiments, the actionable notification is an in-line alert integrated into the user's transactions and/or account status displayed in the client application or other account management interface. In some embodiments, the actionable notification provides means for the user 110 to accept or decline the modification of a third party interaction such as interactive button options displayed by the client interface. In some embodiments, the actionable notification provides means for the user 110 to accept or decline canceling a third party interaction.

In some embodiments, the subscription management application 170 receives the user's instructions for modifying the at least one third party interaction from the user device via the client application.

In some embodiments, based on receiving the user instructions from the user device 111 via the client application, the subscription management application 170 triggers the transmission of a command configured to modify the at least one third party interaction identified as a duplicate third party interaction and then modifies the at least one third party interaction according to the received user instructions.

In some embodiments, the subscription management application 170 continuously monitors the activity of the user accounts for additional, pending third party interactions. In some embodiments, the application 170 allows for the user 110 to add and authorize an additional user account via the client application that was not previously added or authorized during user enrollment.

In some embodiments, the subscription management application 170 places a hold on payments from the user accounts for the pending third party interaction identified.

In some embodiments, the subscription management application 170 transmits an actionable notification to the user device 111 via the client application, the actionable notification being configured to present the pending third party interaction to the user 110, wherein the actionable notification allows for the user 110 to interact with the notification on the user device 111 via the client application to provide user instructions for modifying or taking action on the pending third party interaction. In some embodiments, the user 110 is prompted to select whether to allow or deny payment for the pending third party application. In some embodiments, the actionable notification may present to the user 110 details associated with the pending third party interactions such as a description, a subscription cost, the name of the third party provider associated with the interaction, products and/or services provided by the interaction, and/or the like. In some embodiments, the application 170 may additionally present the one or more third party interactions associated with the user 110 of which the pending third party interaction was identified along with details associated with the one or more third party interactions.

In some embodiments, the subscription management application 170 receives user instructions from the user device 111 via the client application for modifying the pending third party interaction and, based on receiving the user instructions from the user device 111 via the client application, triggers the transmission of a command configured to modify the pending third party interaction, wherein the application 170 modifies the pending third party interaction according to the received user instructions. In some embodiments, the application 170 modifies the pending third party interaction by allowing or denying the payment that was previously placed on hold to the third party provider associated with the pending interaction. In some embodiments of the invention, the application 170 may not transmit an actionable notification to the user 110 and instead automatically modify the pending third party interaction after identifying it as a duplicate third party interaction of another third party interaction already associated with the user 110. In some embodiments, the application 170 modifies the older third party interaction already associated with the user 110 instead of the pending third party interaction.

In some embodiments, the subscription management application 170 triggers the transmission of a command configured to cause the user device 111 to prompt the user 110, via the client application, to provide a reason for modifying the at least one third party interaction, wherein the subscription management application 170 prompts the user 110 to provide the reason for modifying the at least one third party interaction. The subscription management application 170 may request that the user 110 input a response for modifying the third party interaction.

In some embodiments, the subscription management application 170 receives the user's reason for modifying the at least one third party interaction and subsequently stores the user's reason for modifying the third party interaction in the database for future reference.

In some embodiments, the subscription management application 170 presents the user's reason for modifying the third party interaction to a second user. In some embodiments, the second user is in the process of deciding how to modify a third party interaction associated with the second user that is similar or essentially equivalent to the third party interaction that the user modified.

The applications 120, 121, 150, 151, and 170 are for instructing the processing devices 114, 144 and 164 to perform various steps of the methods discussed herein, and/or other steps and/or similar steps. In various embodiments, one or more of the applications 120, 121, 150, 151, and 170 are included in the computer readable instructions stored in a memory device of one or more systems or devices other than the systems 160 and 140 and the user device 111. For example, in some embodiments, the application 120 is stored and configured for being accessed by a processing device of one or more third party systems 192 connected to the network 130. In various embodiments, the applications 120, 121, 150, 151, and 170 stored and executed by different systems/devices are different. In some embodiments, the applications 120, 121, 150, 151, and 170 stored and executed by different systems may be similar and may be configured to communicate with one another, and in some embodiments, the applications 120, 121, 150, 151, and 170 may be considered to be working together as a singular application despite being stored and executed on different systems.

In various embodiments, one of the systems discussed above, such as the financial institution system 140, is more than one system and the various components of the system are not collocated, and in various embodiments, there are multiple components performing the functions indicated herein as a single device. For example, in one embodiment, multiple processing devices perform the functions of the processing device 144 of the financial institution system 140 described herein. In various embodiments, the financial institution system 140 includes one or more of the external systems 196 and/or any other system or component used in conjunction with or to perform any of the method steps discussed herein. For example, the financial institution system 140 may include a financial institution system, a credit agency system, and the like.

In various embodiments, the financial institution system 140, the subscription management system 160, and the user device 111 and/or other systems may perform all or part of a one or more method steps discussed above and/or other method steps in association with the method steps discussed above. In some embodiments, the subscription management system 170 is maintained and/or operated by a financial institution. In some embodiments of the invention, the financial institution system 140 and the subscription management system 170 are combined, wherein the subscription management system 170 is part of the financial institution system 140. Furthermore, some or all the systems/devices discussed here, in association with other systems or without association with other systems, in association with steps being performed manually or without steps being performed manually, may perform one or more of the steps of one or more of the method discussed herein, or other methods, processes or steps discussed herein or not discussed herein.

Referring now to FIG. 2A, the figure illustrates a graphical representation of a portion of a banking application user interface 200, in accordance with some embodiments of the invention. In some embodiments of the invention, the banking application of FIGS. 2A, 2B, 2C, 2D, and 2E is the client application 121. The user interface allows the user 110 to input information, such as commands or data, into the user device 111, and allows the user device 111 to output information to the user. As illustrated in FIG. 2A, in some embodiments, the application presents the user 110 with means for navigating the interface by providing a menu 201. The menu 201 may be a drop-down menu which provides the user 110 with additional interactive selections for navigation within the application. Furthermore, the menu provides a logout option which allows the user 110 to exit the application. Upon logging out or initially launching the application, the user 110 may be prompted by the application to provide authentication information to log in. In some embodiments, the application may provide the user 110, via the user interface, with information related to one or more accounts or resources associated with the user 110 such as bank accounts 202, credit card accounts 203, and the like.

The application my additionally provide actionable alerts or notifications 204 to the user 110 such as alerts regarding savings goals, budgets, offers for goods or services and the like. In some embodiments, the alerts may be in-line with the account information associated with the user 110 or even be presented along with individual transactions. In some embodiments, the user 110 may optionally toggle the appearance of alerts so that they may or may not be displayed via the user interface.

Referring now to FIG. 2B, the figure illustrates a graphical representation of a portion of a banking application user interface for monitoring asset savings 210, in accordance with some embodiments of the invention. As illustrated by element 211, the application presents to the user 110, via the user interface, a projection of asset savings by monitoring financial information associated with the one or more user accounts. In some embodiments, the projection is presented to the user via a graph, chart, or the like, wherein the user 110 may modify the scale of time of the record to reflect weekly, monthly, yearly spending or the like. Additionally, the application may provide the user 110 with one or more actionable alerts or notifications to allow the user 110 to modify his or her saving habits. Furthermore, the application may present asset saving habits and projections for other users determined to be similar to the user 110. In some embodiments, the projection of the user's saving habits updates as the system 170 modifies one or more interactions associated with the user 110. In some embodiments, the application provides one or more interactive fields 212 for the input of parameters used determine the other similar users, such as age, location, salary, and the like.

Referring now to FIG. 2C, the figure illustrates a graphical representation of a portion of a banking application user interface for monitoring asset spending 220, in accordance with some embodiments of the invention. As illustrated by element 221, the application presents to the user 110, via the user interface, a record of asset spending by monitoring financial information associated with the one or more user accounts. In some embodiments, the record is presented to the user 110 via a graph, chart, or the like, wherein the user 110 may modify the scale of time of the record to reflect weekly, monthly, yearly spending or the like. Additionally, the application may provide the user 110 with one or more actionable alerts or notifications to allow the user 110 to modify his or her spending habits. Furthermore, the application may present asset spending habits and projections for other users determined to be similar to the user 110. In some embodiments, the projection of the user's saving habits updates as the system 170 modifies one or more interactions associated with the user 110. In some embodiments, the application provides one or more interactive fields 222 for the input of parameters used determine the other similar users, such as age, location, salary, and the like.

Referring now to FIG. 2D, the figure illustrates a graphical representation of a portion of a banking application user interface for monitoring subscriptions 230, in accordance with some embodiments of the invention. As illustrated by element 231, the application user interface displays credit cards, debit cards, payment accounts, and the like used for the payment of one or more subscriptions and the like associated with the user 110. Additionally, the user 110 is presented with a total cost of the one or more subscriptions 232 associated with the user. As illustrated by element 233, the user interface may present the one or more subscriptions to the user 110 and provide actionable alerts or notifications to the user 110 such as alerts that identify duplicate subscriptions associated with the user 110. The application may present additional details associated with the one or more subscriptions such as cost, sign-up date, renewal data, and the like.

Referring now to FIG. 2E, the figure illustrates a graphical representation of a portion of an application user interface as a subscription hub 240, in accordance with some embodiments of the invention. As illustrated the subscription hub may be associated with the user's online banking application 242. In this way, the subscription hub may be signed into via the online banking portal. The online banking portal may identify the subscriptions that the user may use the resources from the accounts for payment to the subscriptions. As such, the system may put the subscriptions onto the online banking application for visualization and communication with third parties.

As illustrated in section 241, the interface includes a tab or section of the subscriptions that the system identified and extracted from the user's online banking application. In this way, the system monitors and identifies payments made to a same third party over time, in a patterned way to the same third party, a same or similar amount regularly presented to a third party, and/or by identification of a third party being a subscription provider. As illustrated, the system identified three subscriptions, Subscription 1, Subscription 2, and Subscription 3. The user may be allowed to select and add additional subscriptions to the list of user subscriptions.

As illustrated in section 243, the interface 240 the subscriptions are classified into categories, such as entertainment or the like and an amount of resources the user spends per month or year on those subscriptions. Furthermore, the system may provide a selection box in order for the user to access details about the subscription, enable the user to cancel the subscription, and/or modify the subscription.

FIG. 3 provides a high level process flow for subscription regulation 300, in accordance with one embodiment of the invention. As illustrated in block 302, the process 300 is initiated by receiving authorization from the user to access user resource management source locations. These locations may include an online banking application, resource account applications, financial institution, third party, or the like that may manage or monitor a resource account associated with the user.

Once the user has provided the system with authorization, the process 300 continues by identifying the subscriptions from the user resource management source locations as illustrated in block 304. In some embodiments, the system may identify subscriptions from monitoring the user's resource management source locations. In some embodiments, the system may identify payments to third parties that are known to be subscription providers, such as a cable network, magazine, gym, club, or the like. In other embodiments, the system may identify recurring payments to a third party from the resource management source. In this way, the system may identify that the user makes a weekly/monthly/yearly payment from a resource account to a third party. The system may identify reoccurring payments by identifying a payment made to a third party system at approximately the same time of a week/month/year. In other embodiments, the system may identify subscriptions based on user indication to the system of one or more subscriptions that the user has.

Next, as illustrated in block 306, the process 300 continues by extracting information from the accounts associated with interactions between the user and one or more third parties identified as associated with the subscriptions. In this way, the system may extract information about the interaction between the user and the third party providing the subscription. This data extraction may include data about the time, date, or amount of the payment from the user to the third party. Furthermore, this data extraction may further provide an indication as to the third party, the service/product being provided, the terms of the service/product being provided, and the like associated with the subscription.

As illustrated in block 308, the process 300 continues by storing the extracted information associated with the interactions between the third party and the user in a database. The extracted information is stored in a database at the system in order to illustrate a baseline for the subscription and the terms thereof.

Next, as illustrated in block 310, the process 300 continues by exporting location and transaction data associated with the user and the third party associated with the subscription. In this way, the system may link the user location and user transaction data with the location and transactions of the third party subscription provider. As such, the system may track when the user went to a location associated with the third party subscription provider, the amount of additional transactions the user conduced at the third party subscription provider, and the like.

As illustrated in block 312, the process 300 continues by identifying the user of subscriptions based on the user location and transaction data. In this way, based on location data extracted via the user mobile device, the system may identify one or more times during a period of time that the user attended a location associated with the subscription. As such, a user may have went to a gym, club, or the like. The system may track the visit to the location associated with the subscription and monitor the user use of his/her subscription. In some embodiments, the system may track transaction data from one or more resource management sources associated with the user. As such, the system may pull transaction data and identify that the user has spent more resources at a subscription location, such as buying a drink at a gym, or the like.

Next, as illustrated in block 314, the process 300 continues by presenting use and resource allocation options to the user for identified subscriptions via subscription regulation interface. In this way, the system may identify any user underutilization of one or more subscriptions. If the user has not used, as identified by the system extracted location data and transactional data, the subscription benefits, the system may present this indication to the user via the subscription regulation interface. Furthermore, the system may present subscription modification terms agreed upon with the third party subscription provider that may limit and/or modify the user's subscription based on the user's use of the subscription.

In some embodiments, the invention creates a hub for user visualization and interaction with subscription of a user. As such, any resource accounts associated with the subscriptions may be easily viewed, use of the subscription, status of the subscription, and the like may all be visualized via the subscription regulation interface. The user may track records of payment of resources to the subscription, perform actions such as renewal, cancellation, update, modification, and the like via the subscription regulation interface. The subscription regulation interface may provide a user with visualization of his/her use of the subscription, modifications to the subscription, and/or competitor offers that may be more relative to the user's use of that particular resource. Furthermore, in some embodiments, the subscription regulation interface provides a temporary credit card account number for subscriptions, thus being able to regulate and cancel after a trial period or the like.

FIG. 4 illustrates a high level process flow for modifying and triggering action for subscription continuation 400, in accordance with one embodiment of the invention. As illustrated in block 402, the process is initiated by presenting subscriptions via a secure portal using the subscription regulation interface to a user. The subscription regulation interface may be provided via a secure portal from the system to a user device, such as the user's mobile phone. In some embodiments, the subscription regulation interface is a hub for user visualization and interaction with subscription. As such, any resource accounts associated with the subscriptions may be easily viewed, use of the subscription, status of the subscription, and the like may all be visualized via the subscription regulation interface. The user may track records of payment of resources to the subscription, perform actions such as renewal, cancellation, update, modification, and the like via the subscription regulation interface. The subscription regulation interface may provide a user with visualization of his/her use of the subscription, modifications to the subscription, and/or competitor offers that may be more relative to the user's use of that particular resource. Furthermore, in some embodiments, the subscription regulation interface provides a temporary credit card account number for subscriptions, thus being able to regulate and cancel after a trial period or the like.

Next, as illustrated in block 404, the process 400 continues by identifying upcoming renewal requirements for one or more subscriptions associated with the user. In this way, the system may identify an upcoming requirement for the subscription such as a renewal, a change period, a payment increase, or the like. As illustrated in block 406, the identification of an upcoming renewal triggers the presentation of the renewal to the user via the subscription regulation interface. The presentation may be in the form of a ring, notification, popup, or the like. Alternatively, the system may trigger a paralyze signal to the other functions of the user device preventing other functions of the user device upon the presentation of the renewal notification and selection of acknowledgment of the renewal notification.

As illustrated in block 408, the process 400 continues by reviewing the user utilization of the subscription. In this way, the system may extract location data and transaction data to identify the user use of the subscription. In some embodiments, the system may extract location data from the user device. In this way, the system may track and monitor if the user has entered or is near a physical location associated with the subscription. This physical location may be a location of the subscription, such as a gym or club. In other embodiments, the physical location may be a location associated with the same category of the subscription. For example, the user may have a subscription to a woodworking magazine and the user location data may indicate that he/she has visited a woodworking store not necessarily associated with the magazine, but associated with the same category, woodworking, as the subscription. This provides the system with an indication of the level of interest the user may have with renewing the subscription. In some embodiments, the system may extract transaction data associated with the user. The system may be associated and/or linked to a financial institution. Thus, the system may have access to transaction level resource usage data associated with the user. In this way, the system may identify that the user purchases products or services at or near a subscription physical location, such as purchasing drinks or the like at a gym or club. Alternatively, the system may identify purchases by the user in the same category as the subscription. For example, the user may purchase golf equipment and have a membership at a golf course, while the purchase wasn't made at the golf course, the system may identify a correlation based on the purchase being in the same category that predicts that the user is still interested in the golf course subscription.

As illustrated in block 410, the process 400 continues by communicating with the third parties providing the subscription in order to receive renewal and modification terms. The renewal terms may include a renewal duration, price, services provided, or the like associated with the renewal of the subscription. In some embodiments, modifications may be presented to the third party from the system attempting to modify the terms of the subscription based on user location data and transaction data that indicates to the system that a modification to the subscription may be needed. As such, if the system identifies the user utilizing the subscription to full extent based on the location and transaction data, the system may desire a longer term for renewal of the subscription or modification of the subscription to include additional services. In other embodiments, the system may identify the user underutilization of the subscription based on user location and transaction data and request a modification to reduce the products/services of the user subscription terms.

As illustrated in block 412, the process 400 continues by presenting the user with the renewal terms, system selected modifications, and competitor terms for similar products/services based on user utilization of the subscription. In some embodiments, the renewal terms may be the terms from the third party subscription provider for the user to maintain his/her current level of subscription. In some embodiments, the system selected modifications of subscriptions may include system determined modifications in the level of services/products for the subscription and a change in resource requirements for the same. This modification is based on user utilization of the subscription identified from user location data and transactional data. In other embodiments, the system may provide competitor offers for the same or similar subscriptions that may match the user interests better or be more resource friendly based on the user location and transaction data.

Next, as illustrated in block 414, the process 400 continues by receiving the user selection of one or more of the renewal terms, modifications, or competitor subscriptions. As such, the system may receive, via a secure communication linkage from a user device through a network, the user selection of the renewal terms, modifications, or competitor subscription.

As illustrated in block 416, the process 400 is completed by transmitting the appropriate selection to the third party for processing the selected renewal terms, modifications, or competitor subscription.

FIG. 5 illustrates a high level process flow for triggering the modification or canceling of subscriptions 500, in accordance with one embodiment of the invention. As illustrated in block 502, the process 500 is initiated by presenting subscriptions to the user via a secure portal using subscription regulation interface presented on a user device. The subscription regulation interface may be provided via a secure portal from the system to a user device, such as the user's mobile phone. In some embodiments, the subscription regulation interface is a hub for user visualization and interaction with subscription. As such, any resource accounts associated with the subscriptions may be easily viewed, use of the subscription, status of the subscription, and the like may all be visualized via the subscription regulation interface. The user may track records of payment of resources to the subscription, perform actions such as renewal, cancellation, update, modification, and the like via the subscription regulation interface. The subscription regulation interface may provide a user with visualization of his/her use of the subscription, modifications to the subscription, and/or competitor offers that may be more relative to the user's use of that particular resource. Furthermore, in some embodiments, the subscription regulation interface provides a temporary credit card account number for subscriptions, thus being able to regulate and cancel after a trial period or the like.

Next, as illustrated in block 504, the process 500 continues by identifying a lack of use of one or more subscriptions. As such, the system reviews the user utilization of the subscriptions. In this way, the system may extract location data and transaction data to identify the user use of the subscription. In some embodiments, the system may extract location data from the user device. In this way, the system may track and monitor if the user has entered or is near a physical location associated with the subscription. This physical location may be a location of the subscription, such as a gym or club. In other embodiments, the physical location may be a location associated with the same category of the subscription. For example, the user may have a subscription to a woodworking magazine and the user location data may indicate that he/she has visited a woodworking store not necessarily associated with the magazine, but associated with the same category, woodworking, as the subscription. This provides the system with an indication of the level of interest the user may have with renewing the subscription. In some embodiments, the system may extract transaction data associated with the user. The system may be associated and/or linked to a financial institution. Thus, the system may have access to transaction level resource usage data associated with the user. In this way, the system may identify that the user purchases products or services at or near a subscription physical location, such as purchasing drinks or the like at a gym or club. Alternatively, the system may identify purchases by the user in the same category as the subscriptions. For example, the user may purchase golf equipment and have a membership at a golf course, while the purchase wasn't made at the golf course, the system may identify a correlation based on the purchase being in the same category that predicts that the user is still interested in the golf course subscription.

The use of the subscription may be identified based on the location and transaction data from the user. The lack of use of the subscription, as illustrated in block 506, triggers the presentation of one or more subscriptions that have the lack of utilization to the user.

Next, as illustrated in block 508, the process 500 continues by allowing the user to select a cancellation or modification of the subscription. In some embodiments, the system selected modifications of subscriptions may include system determined modifications in the level of services/products for the subscription and a change in resource requirements for the same. This modification is based on user utilization of the subscription identified from user location data and transactional data. In other embodiments, the user may select the cancellation of the subscription and alternatively present competitor offers for the same or similar subscriptions that may match the user interests better or be more resource friendly based on the user location and transaction data.

As illustrated in block 510, the process 500 is terminated by modifying or cancelling the subscriptions selected by the user.

In some embodiments, the subscription regulation interface may allow a user to interact with each of the third parties that are associated with the subscriptions. In this way, if a resource account number associated with a subscription expires, is lost, or is misappropriated, the user may, via the subscription regulation interface input a new resource account number for the subscriptions. As such, the third parties associated with the subscriptions may draw resources from the new resource account without the user being in direct communication with the third party.

In some embodiments of the invention one or more of the systems described herein may be combined with each other, or otherwise perform the functions of the other systems described herein. In other embodiments of the invention one or more of the applications described herein may be combined with each other, or otherwise perform the functions of the other applications described herein. Furthermore, the applications may be any type of application, such as an application stored on a desktop, server, or other device, a mobile application stored on a mobile device, a cloud application, or other like application. As such, the applications described herein, or portions of the applications described herein may be stored and operated on any of the systems or devices described herein. For example, a portion of one or more applications may be stored on the user device, or may be included as a portion of financial institution applications, such as an online banking application, in order to achieve embodiments of the inventions described herein.

It should be understood, that the systems and devices described in FIG. 1, or other devices not specifically described herein, may be configured to establish a communication link with each other in order to accomplish the steps of the processes described herein. The link may be an internal link within the same entity (e.g., within the same financial institution or device provider) or a link with the other systems of entities (e.g., social networking systems, third-party systems, or the like). In some embodiments, the systems may be configured for monitoring the applications and devices that the system(s) utilize as data sources. The information received from monitoring may be provided via wireless network path portions through the Internet. When the systems or devices are not monitoring a source or are not being monitored, the information need not be transmitted from the source through the Internet to the destination, although it could be. The sources of information may be made continuously available, however, continuously available does not necessarily mean that the sources actually continuously generates data, but that a source is continuously available to generate and send data real-time (e.g., instantaneously and/or within a few seconds, or the like) of receiving a request for it. In any case, the sources may be continuously available to receive and/or generate information, in some cases in digitized data in Internet Protocol (IP) packet format. In response to continuously monitoring the real-time data feeds from the various systems or devices, the system may be configured to provide target information to the user and/or allow the user to make changes to or control the applications and/or devices.

Moreover, it should be understood that the process flows described herein include transforming the information sent and/or received from the applications of the different systems (e.g., internally or externally) and/or the devices from one or more data formats into a data format associated with an application for display to the user on the user device. There are many ways in which information is converted within the system environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may converting to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
|---|---|---|
| 15/288,565 | LEVERAGING AN ARTIFICIAL INTELLIGENCE ENGINE TO GENERATE CUSTOMER-SPECIFIC USER EXPERIENCES BASED ON REAL-TIME ANALYSIS OF CUSTOMER RESPONSES TO RECOMMENDATIONS | Concurrently herewith |
| 15/288,797 | REAL-TIME DYNAMIC GRAPHICAL REPRESENTATION OF RESOURCE UTILIZATION AND MANAGEMENT | Concurrently herewith |
| 15/288,819 | SYSTEM FOR TRANSMISSION AND USE OF AGGREGATED METRICS INDICATIVE OF FUTURE CUSTOMER CIRCUMSTANCES | Concurrently herewith |
| 15/288,805 | SYSTEM FOR GENERATING USER EXPERIENCE FOR IMPROVING EFFICIENCIES IN COMPUTING NETWORK FUNCTIONALITY BY SPECIALIZING AND MINIMIZING ICON AND ALERT USAGE | Concurrently herewith |
| 15/288,833 | SYSTEM FOR AUTOMATICALLY ESTABLISHING AN OPERATIVE COMMUNICATION CHANNEL TO TRANSMIT INSTRUCTIONS FOR CANCELING DUPLICATE INTERACTIONS WITH THIRD PARTY SYSTEMS | Concurrently herewith |

What is claimed is:

1. A system for a subscription regulation operative communication channel, the system comprising:
a memory device with computer-readable program code stored thereon;
a communication device; a processing device operatively coupled to the memory device and the communication device, wherein the processing device is configured to execute the computer-readable program code to:
receive authorization from a subscription regulation interface active on a user device via a secure communication portal, wherein the authorization allows access to user resource management source locations;
extract user resource distribution information from the user resource management source locations, wherein the user resource distribution information comprises information about interactions between a user and third parties, wherein the user resource distribution information includes a date, time, and amount of resources provided in payment from the user to the third party;
identify reoccurring user resource distributions and the third parties associated with the distributions;
confirm, via the communication portal, a subscription associated with the reoccurring user resource distributions;
extract a location associated with the reoccurring user resource distributions, wherein the extraction identities the location of the third party and is based on the user authorization received from the subscription regulation interface;
present to the third party providing the subscription requested modifications, wherein the modifications modify terms of the subscription based on user utilization of the subscription;
trigger presentation via the subscription regulation interface of underutilization of subscription based on extracted location data points and resource distribution data;
present the modification for user selection via the subscription regulation interface for the underutilized subscription, wherein the modifications are previously presented to the third party and are selected and determined based on a change in resource requirements for the modification of the underutilizing of the subscription;
and process the user selected modification and terminate the subscription associated with the reoccurring user resource distributions.

2. The system of claim 1, wherein triggering presentation of underutilization of subscription based on extracted location data points and resource distribution data further comprises identifying locations the user traveled and purchases the user made via the extracted location data points and resource distribution data associated with the user to not be associated with the subscription, the third party, or the category of the subscription.

3. The system of claim 1, further comprising triggering a presentation via the subscription regulation interface of one or more subscriptions for renewal, wherein the renewal is presented by the subscription regulation interface upon identification of use of the subscription based at least in part on the extracted location data points and resource distribution data associated with the user to be associated with the subscription, the third party, or the category of the subscription.

4. The system of claim 1, wherein presenting modifications for user selection via the subscription regulation interface to the underutilized subscription further comprise communicating with the third party associated with the underutilized subscription for presenting cancellation options for the underutilized subscription to the user and presenting modifications to the underutilized subscription that reducing the resource requirements for the subscription user, wherein presenting modifications for user selection further comprises presenting competitor subscriptions to the user.

5. The system of claim 1, wherein confirming, via the communication portal, the subscription associated with the reoccurring user resource distributions further comprises identifying a physical location of the third parties associated with the subscription and a category of products and/or services provided via the subscription.

6. The system of claim 1, wherein processing the user selected modification further comprises providing the third party with a generic account number for initial resource distribution to the third party for the modification of the subscription.

7. The system of claim 1, wherein extracting location data points associated with the user device and resource distribution data associated with user resource distribution further comprises identifying locations that the user has traveled and resource distributions associated with product/service purchases the user made and identifying a category of the locations and purchases, wherein the category is compared to a category identified as associated with the subscription and determined to be of the same category of product or service.

8. A computer program product for a subscription regulation operative communication channel, the computer program product comprising at least one non-transitory computer readable medium having computer-readable program code portions embodied therein, the computer-readable program code portions comprising:
   an executable portion configured for receiving authorization from a subscription regulation interface active on a user device via a secure communication portal, wherein the authorization allows access to user resource management source locations;
   an executable portion configured for extracting user resource distribution information from the user resource management source locations, wherein the user resource distribution information comprises information about interactions between a user and third parties, wherein the user resource distribution information includes a date, time, and amount of resources provided in payment from the user to the third party;
   an executable portion configured for identifying reoccurring user resource distributions and the third parties associated with the distributions;
   an executable portion configured for confirming, via the communication portal, a subscription associated with the reoccurring user resource distributions;
   an executable portion configured for extracting a location associated with the reoccurring user resource distributions, wherein the extraction identifies the location of the third party and is based on the user authorization received from the subscription regulation interface;
   an executable portion configured for presenting to the third party providing the subscription requested modifications, wherein the modifications modify terms of the subscription based on user utilization of the subscription;
   an executable portion configured for triggering presentation via the subscription regulation interface of underutilization of subscription based on extracted location data points and resource distribution data;
   an executable portion configured for presenting the modification for user selection via the subscription regulation interface for the underutilized subscription, wherein the modifications are previously presented to the third party and are selected and determined based on a change in resource requirements for the modification of the underutilizing of the subscription;
   and an executable portion configured for processing the user selected modification and terminate the subscription associated with the reoccurring user resource distributions.

9. The computer program product of claim 8, wherein triggering presentation of underutilization of subscription based on extracted location data points and resource distribution data further comprises identifying locations the user traveled and purchases the user made via the extracted location data points and resource distribution data associated with the user to not be associated with the subscription, the third party, or the category of the subscription.

10. The computer program product of claim 8, further comprising an executable portion configured for triggering a presentation via the subscription regulation interface of one or more subscriptions for renewal, wherein the renewal is presented by the subscription regulation interface upon identification of use of the subscription based at least in part on the extracted location data points and resource distribution data associated with the user to be associated with the subscription, the third party, or the category of the subscription.

11. The computer program product of claim 8, wherein presenting modifications for user selection via the subscription regulation interface to the underutilized subscription further comprise communicating with the third party associated with the underutilized subscription for presenting cancellation options for the underutilized subscription to the user and presenting modifications to the underutilized subscription that reducing the resource requirements for the subscription user, wherein presenting modifications for user selection further comprises presenting competitor subscriptions to the user.

12. The computer program product of claim 8, wherein confirming, via the communication portal, the subscription associated with the reoccurring user resource distributions further comprises identifying a physical location of the third parties associated with the subscription and a category of products and/or services provided via the subscription.

13. The computer program product of claim 8, wherein processing the user selected modification further comprises providing the third party with a generic account number for initial resource distribution to the third party for the modification of the subscription.

14. The computer program product of claim 8, wherein extracting location data points associated with the user device and resource distribution data associated with user resource distribution further comprises identifying locations that the user has traveled and resource distributions associated with product/service purchases the user made and identifying a category of the locations and purchases, wherein the category is compared to a category identified as associated with the subscription and determined to be of the same category of product or service.

15. A computer-implemented method for a subscription regulation operative communication channel, the method comprising:
   providing a control device and control device housing comprising computing system comprising a computer processing device and a non-transitory computer readable medium, where the computer readable medium comprises configured computer program instruction code, such that when said instruction code is operated by said computer processing device, said computer processing device performs the following operations:
   receiving authorization from a subscription regulation interface active on a user device via a secure communication portal, wherein the authorization allows access to user resource management source locations;
   extracting user resource distribution information from the user resource management source locations, wherein the user resource distribution information comprises information about interactions between a user and third parties, wherein the user resource distribution information includes a date, time, and amount of resources provided in payment from the user to the third party;
   identifying reoccurring user resource distributions and the third parties associated with the distributions;

confirming, via the communication portal, a subscription associated with the reoccurring user resource distributions;

extracting a location associated with the reoccurring user resource distributions, wherein the extraction identifies the location of the third party and is based on the user authorization received from the subscription regulation interface;

presenting to the third party providing the subscription requested modifications, wherein the modifications modify terms of the subscription based on user utilization of the subscription;

triggering presentation via the subscription regulation interface of underutilization of subscription based on extracted location data points and re source distribution data;

presenting the modification for user selection via the subscription regulation interface for the underutilized subscription, wherein the modifications are previously presented to the third party and are selected and determined based on a change in resource requirements for the modification of the underutilizing of the subscription;

and processing the user selected modification and terminate the subscription associated with the reoccurring user resource distributions.

16. The computer-implemented method of claim 15, wherein triggering presentation of underutilization of subscription based on extracted location data points and resource distribution data further comprises identifying locations the user traveled and purchases the user made via the extracted location data points and resource distribution data associated with the user to not be associated with the subscription, the third party, or the category of the subscription.

17. The computer-implemented method of claim 15, further comprising triggering a presentation via the subscription regulation interface of one or more subscriptions for renewal, wherein the renewal is presented by the subscription regulation interface upon identification of use of the subscription based at least in part on the extracted location data points and resource distribution data associated with the user to be associated with the subscription, the third party, or the category of the subscription.

18. The computer-implemented method of claim 15, wherein presenting modifications for user selection via the subscription regulation interface to the underutilized subscription further comprise communicating with the third party associated with the underutilized subscription for presenting cancellation options for the underutilized subscription to the user and presenting modifications to the underutilized subscription that reducing the resource requirements for the subscription user, wherein presenting modifications for user selection further comprises presenting competitor subscriptions to the user.

19. The computer-implemented method of claim 15, wherein confirming, via the communication portal, the subscription associated with the reoccurring user resource distributions further comprises identifying a physical location of the third parties associated with the subscription and a category of products and/or services provided via the subscription.

20. The computer-implemented method of claim 15, wherein extracting location data points associated with the user device and resource distribution data associated with user resource distribution further comprises identifying locations that the user has traveled and resource distributions associated with product/service purchases the user made and identifying a category of the locations and purchases, wherein the category is compared to a category identified as associated with the subscription and determined to be of the same category of product or service.

* * * * *